United States Patent
Bates et al.

(10) Patent No.: US 6,895,580 B2
(45) Date of Patent: May 17, 2005

(54) EXPRESSION REDUCTION DURING COMPILATION THROUGH ROUTINE CLONING

(75) Inventors: Cary Lee Bates, Rochester, MN (US); John Matthew Santosuosso, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 09/957,588

(22) Filed: Sep. 20, 2001

(65) Prior Publication Data

US 2003/0056083 A1 Mar. 20, 2003

(51) Int. Cl.[7] .............................................. G06F 9/45
(52) U.S. Cl. .................... 717/157; 717/144; 717/161
(58) Field of Search ............................... 717/106–108, 717/140–161

(56) References Cited

U.S. PATENT DOCUMENTS

| | | | |
|---|---|---|---|
| 5,701,489 A | 12/1997 | Bates et al. ................. | 717/157 |
| 5,740,443 A * | 4/1998 | Carini ......................... | 717/133 |
| 5,790,867 A | 8/1998 | Schmidt et al. ............. | 717/155 |
| 5,937,196 A | 8/1999 | Schmidt et al. ............. | 717/155 |

OTHER PUBLICATIONS

Cooper et al., "Procedure Cloning", IEEE, pp.: 96–105, 1992.*

* cited by examiner

Primary Examiner—Ted T. Vo
(74) Attorney, Agent, or Firm—Wood, Herron & Evans

(57) ABSTRACT

An apparatus, program product, and method utilize routine cloning to optimize the performance of a compiled computer program. Within a compiled representation of a computer program, an implementation of a called routine is generated that has the same external response as the original routine, but is modified from the original routine to calculate the result of an expression, which was originally provided as an input parameter to the routine, within the body of the routine. In addition, the signature of the new implementation of the routine is modified to accept, in lieu of the input parameter that originally received the result of the expression, one or more input parameters representative of the argument(s) to be operated upon by the expression.

32 Claims, 3 Drawing Sheets

EXPRESSION REDUCTION DURING COMPILATION THROUGH ROUTINE CLONING

FIELD OF THE INVENTION

The invention relates to compilers and methods of compiling. More particularly, the invention relates to expression reduction during compilation of a computer program.

BACKGROUND OF THE INVENTION

Compilers are generally used to transform one representation of a computer program into another representation. Typically, but not exclusively, compilers are used to transform a human readable form of a program such as source code into a machine readable form such as object code. By doing so, a human programmer is able to write a computer program in a high level, human readable form, and then generate low level program code that operates quickly and efficiently on a particular type of computer.

One type of compiler is an optimizing compiler, which includes an optimizer or optimizing module for enhancing the performance of the machine readable representation of a program. Some optimizing compilers are separate from a primary compiler, while others are built into a primary compiler to form a multi-pass compiler. Both types of compilers may operate either on a human readable form, a machine readable form, or any intermediate representation between these forms.

Many optimizing modules of compilers operate on intermediate representations of computer programs, and often on specific routines or procedures within those programs. Other optimizers are interprocedural optimizers that are capable of operating upon multiple procedures, or compilation units, collectively.

A wide variety of optimizations may be performed during compilation of a computer program. Some optimizations focus on optimizing the execution of program statements, and in particular expressions that are calculated by those statements. An expression typically incorporates at least one argument and at least one operation, be it logical, arithmetical, etc., to be performed on the argument. Thus, for example, the expression "a+b" has arguments "a" and "b" and an addition operation.

One type of expression-based optimization, for example, is copy propagation, or redundant copy elimination, which is a form of expression reduction that attempts to locate copy expressions and "propagate" the results of such expressions to later expressions that use the results of the earlier expressions. Thus, for example, if an expression "t=s" is followed by the expression "x=t+z", and it is known that the value of t never changes between the expressions, the first expression can be eliminated, and the second expression can be modified to the de facto equivalent expression "x=s+z". As such, one expression is eliminated, and the program executes more efficiently as a result.

Another type of expression-based optimization is forward store motion, which attempts to move expressions that are calculated all of the time, but used only some of the time, to locations where they will only be calculated when necessary. Thus, for example, if a particular expression "x=t+z" is found in a program, and is followed by a conditional statement that branches down one of two paths based upon a decision that does not involve the outcome of that expression, and that uses the value of x in only one of those paths, often the expression can be moved to that path so that the expression will not be calculated when the program proceeds along the other path.

Other types of optimizations are based in part on optimizing the execution of routines within a computer program, e.g., various procedures, functions, methods, etc. that perform various desirable operations that need to be accessed at different points in a computer program. Through the use of routines, a sequence of program code that performs a particular operation does not need to be repeated in the program every time that particular operation is desired. Rather, the sequence of program code can be organized into a routine, so that every time that operation is required, a routine call may be made to invoke execution of the routine.

Routines are often capable of receiving input and/or generating output. Input is often received through one or more input parameters supplied within a call to the routine. A routine also is typically defined with a particular "signature" that defines what input parameters are expected when a routine is invoked by a routine call. Thus, whenever it is desirable to invoke a routine, a call is made with the expected input parameters supplied within the call. Thus, for example, if a particular routine is provided to print text to a video display, the routine signature might specify that a text string to be displayed be provided in the routine call. Conventional programming environments often denote routine calls through the use of the name of the routine being called, followed by the input parameters separated by commas and delimited by parentheses. Thus, assuming the aforementioned routine is named "print", a routine call to that routine might take the form of "print("Hello World!")", where the input parameter is the text string "Hello World!".

The use of routines can substantially simplify program development, as preexisting routines can often be reused in new computer programs simply by generating suitable routine calls in the new programs. Nonetheless, the invocation of routines often comes with increased processing overhead, and can slow performance. Thus, a number of optimizations focus on avoiding unnecessary routine calls in certain circumstances. As an example, "inlining" is a particular optimization that is sometimes used to replace a call to a particular routine with the actual program code in the body of the routine. Given, however, that inlining typically increases the size of the resulting optimized program code, it is typically limited to those situations where a distinct performance benefit can be obtained.

Despite the performance gains that can be obtained via the aforementioned conventional optimizations, and in particular with respect to optimizing the usage of expressions and routines, a significant need still exists for improved optimization approaches that derive additional performance benefits over those available through conventional approaches.

SUMMARY OF THE INVENTION

The invention addresses these and other problems associated with the prior art by providing improved expression reduction via a concept referred to herein as "routine cloning". In particular, the invention addresses the specific situation where one or more expressions is provided as an input parameter to a routine in connection with a routine call, or invocation.

Specifically, it has been found that in many circumstances, some or all of the input parameters provided to a routine in connection with a routine call are never (or are infrequently) used by the routine during execution of that routine. Nonetheless, whenever an expression is provided as an input parameter to a routine, that expression must be calculated every time the routine is called. Thus, whenever an expression is provided as an input parameter to a routine, but the result of that expression is not used by the routine during its execution, the calculation of the expression becomes superfluous, and thus unnecessarily degrades performance.

Embodiments consistent with the invention utilize routine cloning to address this particular problem and thereby optimize program performance. With routine cloning, an implementation of a called routine is generated that has the same external response as the original routine (i.e., has the same output or result in response to the same input), but is modified from the original routine to calculate the result of an expression, which was originally provided as an input parameter to the routine, within the body of the routine. In addition, the signature of the new implementation of the routine is modified to accept, in lieu of the input parameter that originally received the result of the expression, one or more input parameters representative of the argument(s) to be operated upon by the expression. Then, by generating an implementation of the original routine call to call the new implementation of the routine, and to supply input parameters that match the signature of the new implementation of the routine, calculation of the expression is effectively transferred from the calling routine to the called routine. In many instances, and often with the assistance of additional optimizations, this results in increased performance due to the elimination of unnecessary expression calculations.

Consistent with one aspect of the invention, therefore, a computer program may be compiled such that a routine call that passes an expression as an input parameter to a routine is identified in a first representation of the computer program. Within a second representation of the computer program that is generated from the first representation, implementations of both the routine and the routine call are generated. The implementation of the routine calculates the expression, and the implementation of the routine call passes at least one argument for the expression to the implementation of the routine. As such, the expression is calculated, if at all, within the routine instead of in connection with the routine call.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter implement routine cloning to assist in expression reduction during compilation of a computer program from one representation to another representation. In general, the embodiments discussed hereinafter identify a routine call within a computer program that incorporates an expression within the routine call itself, i.e., in the form of an input parameter to the routine referenced by the routine call. For such a routine call, a determination is typically made as to whether cloning of the referenced routine would be beneficial from a performance standpoint, and if so, the routine referenced by such a routine call is "cloned", and the routine call is modified to reference the cloned routine instead of the original routine.

A cloned representation of a routine typically has the same external response as the original representation of the routine—that is, when presented with the same input, the cloned and original representations of the routine will generate the same output. However, a cloned representation of a routine typically differs from the original representation of the routine by virtue of the fact that the body of the routine is modified to calculate the expression originally provided to the routine via the original routine call. In addition, the signature of the routine is modified to receive the arguments to the original expression as input parameters, such that the original input parameter that was fed by the expression in the original routine call is calculated within the cloned routine, rather than being calculated prior to making the original routine call.

An expression within the context of the invention may include any program code including at least one argument, and at least one operation performed on that argument. Thus, for example, the expression "A+5" includes two arguments (the variable A and the constant 5) and one operation (addition), while the expression "A/2+5" includes three arguments (the variable A and the constants 2 and 5) and two operations (division and addition) and the expression "++A" includes a single argument (the variable A) and a single operation (pre-increment). Other, more complex and computationally-expensive operations, e.g., function calls such as sin ( ), cos ( ), sqrt( ), toString( ), etc., may also be incorporated into an expression as well.

Also, a routine within the context of the invention may include any organizational structure or program element within a computer program that is capable of receiving one or more input parameters and performing one or more operations on those parameters, including, among others, procedures, functions, methods, object methods, etc. A routine may output one or more output parameters, although some routines may return no result to a calling entity. Moreover, a routine call may be represented in a number of ways in different programming environments.

Figure 1:
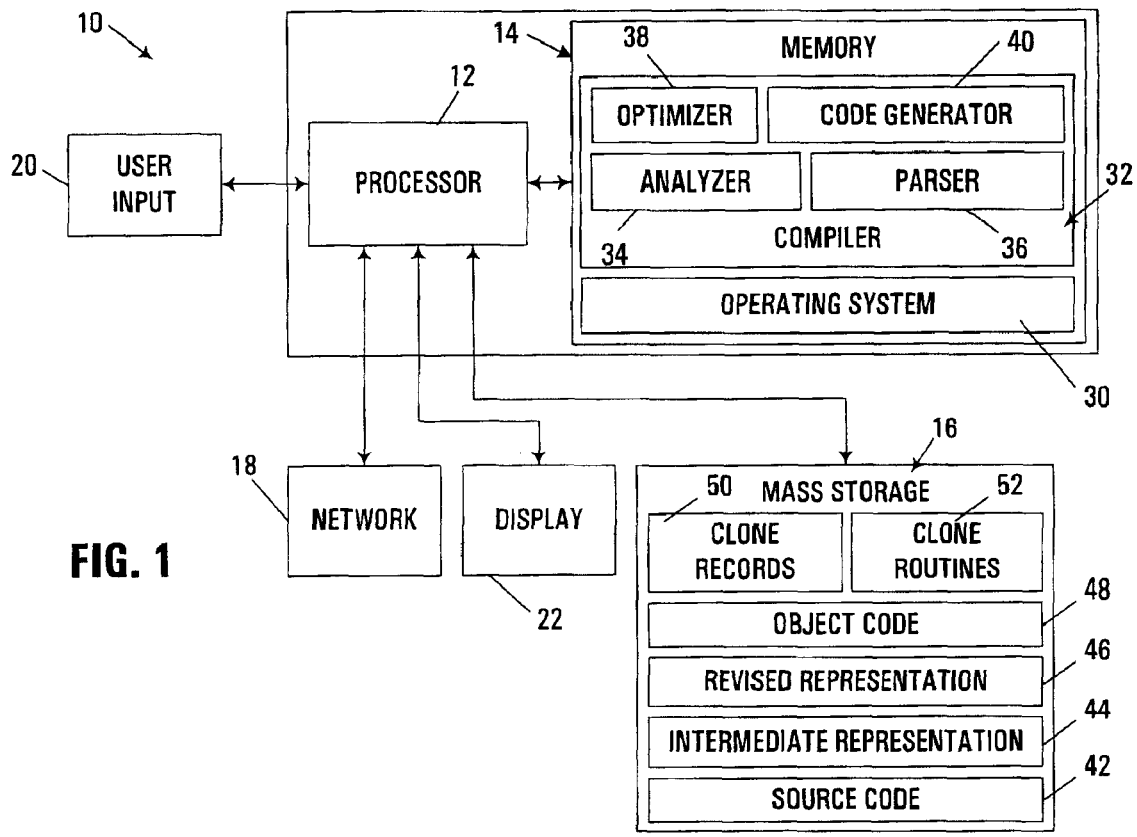
FIG. 1 is a block diagram of an exemplary hardware and software environment including a compiler suitable for performing routine cloning in a manner consistent with the invention.

Turning now to the Drawings, wherein like numbers denote like parts throughout the several views, FIG. 1 illustrates an exemplary hardware and software environment for an apparatus 10 suitable for implementing routine cloning in a manner consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18.

Computer 10 also typically receives a number of inputs and outputs for communicating information externally. For interface with a user or operator, computer 10 typically includes one or more user input devices 20 (e.g., a keyboard, a mouse, a trackball, a joystick, a touchpad, and/or a microphone, among others) and a display 22 (e.g., a CRT monitor, an LCD display panel, and/or a speaker, among others). Otherwise, user input may be received via another computer interfaced with computer 10 over network 22, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 20 and 22 as is well known in the art.

Computer 10 operates under the control of an operating system 30, and executes or otherwise relies upon various computer software applications, components, programs, objects, modules, data structures, etc. (e.g., components 32–52, among others). Moreover, various applications, components, programs, objects, modules, etc. may also execute on one or more processors in another computer coupled to computer 10 via a network 22, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Routine cloning consistent with the invention is typically implemented within a programming or developer environment that includes a compiler, e.g., an optimizing compiler 32 as shown in FIG. 1. Optimizing compiler 32 functions as a multi-pass optimizing compiler, and generally includes a front-end module for converting source code into an intermediate representation, and a back-end module that takes the intermediate representation and generates object code. A general compilation routine executed by compiler 32 is illustrated at 60 in FIG. 2, which begins with performing front-end compilation at block 62 to convert source code 42 into an intermediate representation 44.

Figure 2:
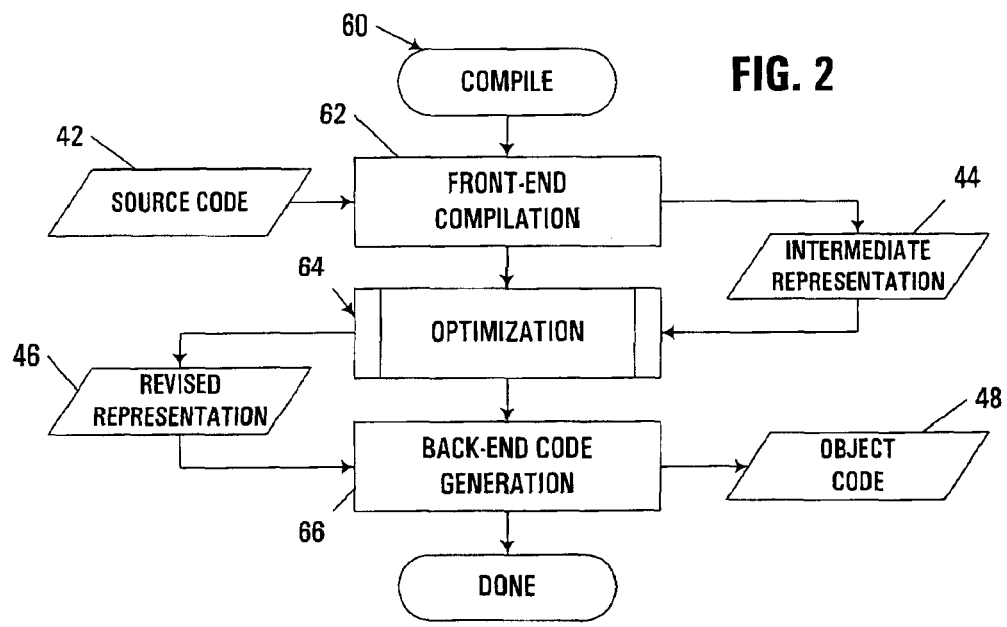
FIG. 2 illustrates the program flow of a compile routine executed by the compiler referenced in FIG. 1.

As illustrated in FIG. 1, front-end compilation in compiler 32 is typically performed with the aid of a lexicographic analyzer 34 that identifies tokens or keywords in the source code, and a parser 36 that analyzes the program statement by statement. The parser typically uses a context-free grammar to determine if program statements satisfy a set of grammar rules, and builds constructs. The parser then generates from source code 42, an intermediate representation 44 using an intermediate code generator incorporated therein, as shown in FIG. 2.

As also shown in FIG. 1, the back-end module of a multi-pass optimizing compiler 32 typically includes an optimizer or optimizing module 38 and a code generator 40. As shown in FIG. 2, optimizer 38 executes one or more optimization routines 64 that operate on the intermediate representation 44 to generate a revised or optimized intermediate representation 46. Thereafter, as represented in block 66, back-end code generation is performed by code generator 40 to generate object code 48 from the revised intermediate representation 46.

Several different optimizations may be performed by optimizer 38 (FIG. 1), including but not limited to local optimizations such as value numbering, elimination of redundant computations, register allocation and assignment, instruction scheduling to match specific machine characteristics, moving invariant code out of loops, strength reduction, induction variable elimination, copy propagation, and forward store motion, among others. In addition, as will be discussed in greater detail hereinafter, optimizer 38 may also be used to implement routine cloning consistent with the invention. One result of this operation is the generation of one or more clone routines, represented at 52 in FIG. 1.

In other embodiments, however, routine cloning may be performed at different stages of optimization and/or compilation, and on different representations of a computer program, as well as in different types of compilers. Moreover, routine cloning may be implemented in other programming and/or development environments, including within just-in-time compilers, translators, interpreters, linkers, etc. Therefore, the invention is not limited to the particular optimizing compiler implementation discussed herein, and furthermore, the term compiling should be understood to incorporate other forms of translating, interpreting or otherwise converting a program from one representation to another.

It will be appreciated that a compiler may reside within the memory of the computer system upon which the object code generated by the compiler is executed. Alternatively, a compiler may be a cross-compiler that resides on one computer system to generate object code for execution on another computer system. Either type of compiler may be used consistent with the invention.

One suitable back-end module for use with the invention is an AS/400 optimizing translator supplied with an AS/400 or iSeries eServer midrange computer, which is a common back-end module of an optimizing compiler. This product may be used with a front-end module such as the ILE C Compiler available from International Business Machines Corporation, among others. It will be appreciated that other compilers are suitable for different languages and/or different hardware platforms, and may also be used in the alternative.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Figure 3:
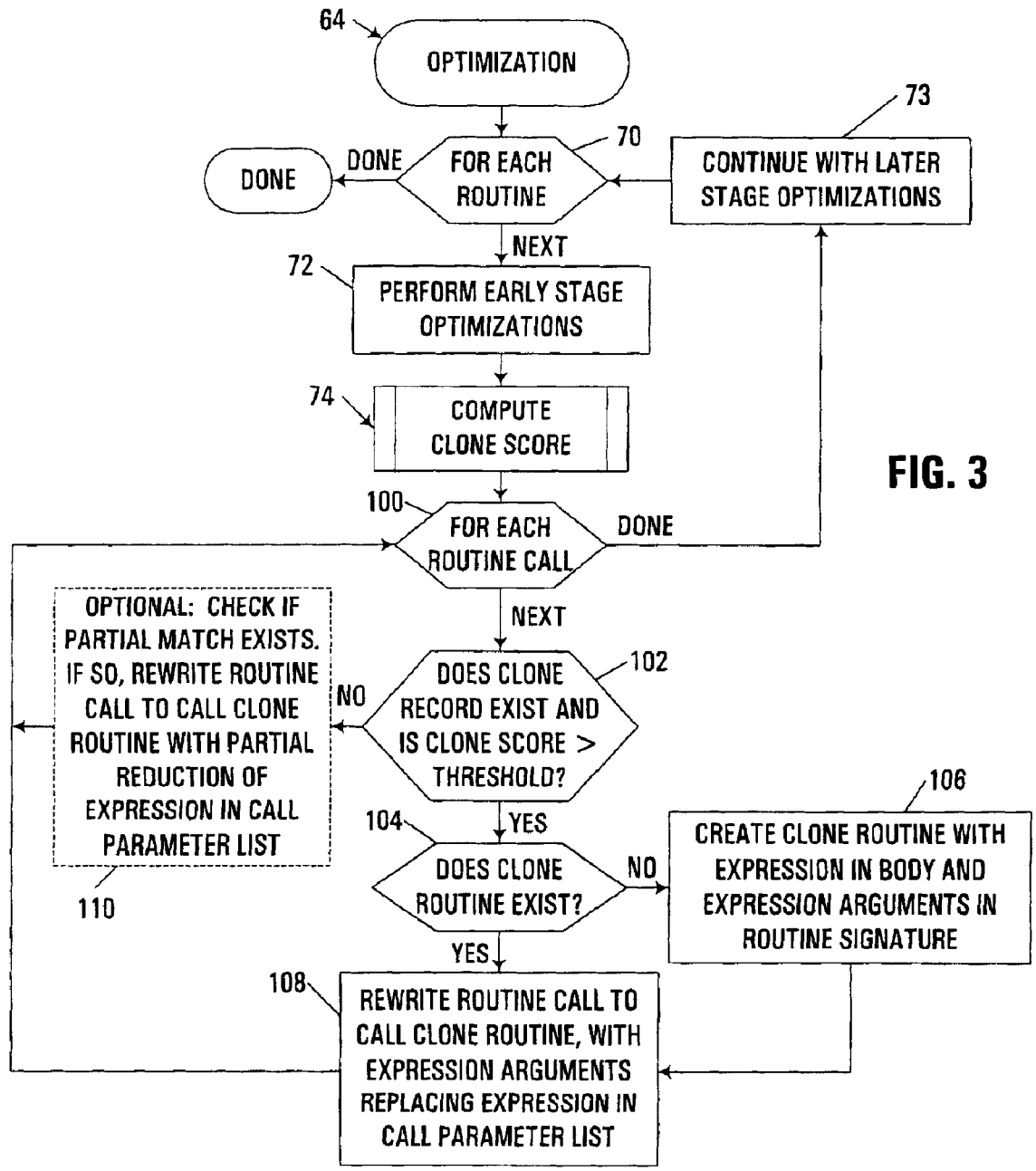
FIG. 3 illustrates the program flow of the optimization routine referenced in FIG. 2.

Now turning to FIG. 3, an optimization routine 64 suitable for performing routine cloning consistent with the invention is shown. Routine 64 begins in block 70 by initiating a loop that processes each routine in a computer program being optimized. As discussed above, routine 64 may instead perform interprocedural optimization, whereby a routine-by-routine processing sequence may not necessarily be performed.

For each routine in the computer program, early-stage optimizations are typically performed as shown in block 72, prior to performing the routine cloning optimization discussed herein. Moreover, upon completion of routine cloning optimization for a particular routine, one or more later stage optimizations may be performed thereafter, as shown in block 73. Once each routine in a computer program has been processed, optimization routine 64 is complete.

Within each of blocks 72 and 73, various conventional optimizations may be performed, including, for example, optimizations such as value numbering, elimination of redundant computations, register allocation and assignment, instruction scheduling to match specific machine characteristics, moving invariant code out of loops, strength reduction, induction variable elimination, copy propagation, and forward store motion, among others. The precise ordering for such optimizations can vary in different environments. However, in the illustrated embodiment, it should be noted that optimizations such as forward store motion may provide additional benefits when executed subsequent to routine cloning, and that optimizations such as copy propagation may provide additional benefits when executed prior to routine cloning.

As also discussed above, routine cloning is typically performed in connection with generating one representation of a computer program from another representation thereof. In the illustrated embodiment, routine cloning is performed during optimization, and as such, routine cloning may be considered to be performed in connection with generating a revised intermediate representation from an intermediate representation of a computer program. In addition, in this context, generation of program code in one representation to represent a particular program element in the other representation will be referred to herein as implementing that program element. Therefore, for example, when routine cloning is implemented within optimizer 38 as in the embodiment discussed herein, cloning of a particular routine in an intermediate representation of a computer program incorporates implementing, or generating an implementation of, a cloned version of that particular routine in the revised representation. It should also be noted that generating an implementation of a routine may include generating a cloned copy of that routine, while leaving an original copy of the routine in the revised representation. In the alternative, generation of a cloned copy of a routine may incorporate revising the original routine to incorporate the revised functionality, thereby destroying or omitting the original copy of the routine from the revised representation. Furthermore, where different expressions are provided as input parameters to different routine calls to the same routine, multiple clone routines may be generated from an original routine as a component of routine cloning consistent with the invention.

Figure 4:
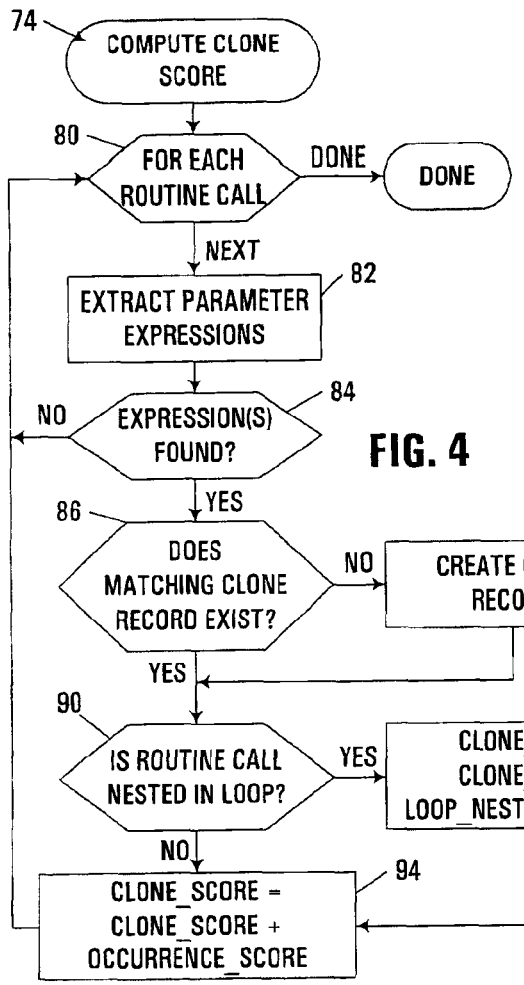
FIG. 4 illustrates the program flow of the compute clone score routine referenced in FIG. 3.

Returning to FIG. 3, to perform routine cloning for a routine being processed during optimization, a compute clone score routine 74 is initially called subsequent to early stage optimizations in block 72. As shown in FIG. 4, for example, computation of a clone score begins in block 80 by initiating a loop to process each routine call (i.e., each call to another routine) found within the routine currently being analyzed. Once all routine calls have been processed for the current routine, control is returned to optimization routine 64.

For each such routine call, block 80 passes control to block 82 to extract any parameter expressions from the routine call. In this context, a parameter expression is an expression that is provided as an input parameter in connection with the routine call.

Next, block 84 determines whether any expressions were found in the routine call. If not, control returns to block 80 to process the next routine call. Otherwise, control passes to block 86 to determine whether a matching clone record exists for the routine call.

Figure 5:
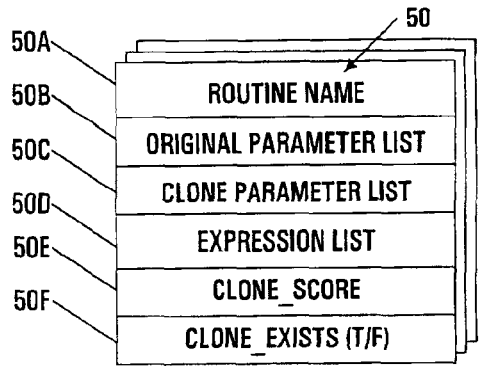
FIG. 5 is a block diagram of an exemplary format for the clone record data structures referenced in FIG. 1.

A clone record is generally associated with a particular routine call format, including a specific target routine identifier and input parameter format data that identifies an input parameter format and an expression format for at least one input parameter. As shown in FIG. 5, for example, one exemplary data structure implementation of a clone record 50 includes a plurality of fields 50A–50F. Field 50A stores a routine name, representing the name of the routine that is invoked by a given routine call with which the clone record is associated. Field 50B stores an original parameter list, representing the input parameters provided to the routine call, and the data or object types expected by each of those parameters. Field 50C includes a clone parameter list, representing the revised parameter list and data types to be implemented in a routine call to a cloned routine. Field 50D stores an expression list, representing a list of expressions provided as input parameters within the original parameter list for the associated routine call.

Each expression in the expression list may be represented, for example, using an expression tree that parses the expression into a tree of nodes, with operations defined at non-leaf nodes and arguments defined at the leaf nodes of the tree. In this context, each argument may simply be represented by an expected data type, thus defining an expression format for at least one input parameter. Other representations of an expression may be used in the alternative.

Field 50E stores a clone_score value, representing the "score" for the routine call format, which is used in a determination of whether routine cloning should be invoked in connection with a particular format of routine call. Similarly, field 50F stores a clone_exists flag that indicates whether a clone routine has been generated in connection with the routine call format with which the clone record 50 is associated.

It should be appreciated that a wide variety of alternate data structures may be utilized to store the information associated with a clone record, and further, that different information may be stored in a clone record consistent with the invention. For example, a record 50 may also include a pointer or identifier for a clone routine, or a copy of the program code for the clone routine.

Returning again to FIG. 4, a determination of whether a matching clone record exists in block 86 incorporates a search of the available clone records to locate a clone record having a routine name, original parameter list, and expression list matching that of the routine call being analyzed. If no such clone record exists, block 86 passes control to block 88 to create such a clone record. Upon creation of a clone record, fields 50A, 50B and 50D are populated with the information relevant to the current routine call, and fields 50E and 50F are respectively initialized to NULL and FALSE values. In some implementations, field 50C may also be populated in block 88, although in other implementations it may be desirable to defer such population until it is determined that a clone routine would be beneficial.

Upon completion of block 88, or if a matching clone record is found, control next passes to block 90 to update the clone score for the routine call format. In particular, various information associated with various routine call occurrences may be utilized to accumulate a clone score for that routine call format that is representative of the relative value that could be obtained from cloning the called routine. For example, whenever a routine call occurrence is nested in a loop, it is likely that the routine call occurrence will be called multiple times, and thus the benefits of routine cloning for that particular routine call format will become more pronounced. As such, it may be desirable in block 90 to determine whether the routine call is nested in a loop. If so, control may pass to block 92 to increment the clone_score field with a value indicative of the relevancy of nesting of the routine call in a loop. For example, block 92 is illustrated as incrementing the clone_score field by a value equal to the product of a loop_nest variable and a loop_score constant. The loop_nest variable represents the nest level of the routine call, i.e., the number of nested loops within which the routine call is found. The loop_score constant represents a relative score or relevancy value to associate with each nested loop.

After a loop-related score is added in block 92, or if it is determined that the routine call is not nested in a loop, control passes to block 94 to add an occurrence_score value to the clone_score field, representing the amount of value to be added to the clone_score field based upon the presence of the routine call in the computer program. Thus, the simple occurrence of a routine call in a computer program will be granted some weight in determining whether to clone a particular routine.

Upon completion of block 94, control returns to block 80 to process the next routine call in the current routine being analyzed.

It should be appreciated that the relative weighting of the occurrences of routine calls and the nesting thereof within one or more loops may be varied for different applications. Moreover, other manners of calculating a clone_score value or rating may be used in the alternative. For example, the fact that a routine call is nested within a loop may not be considered when calculating a clone score. Moreover, more sophisticated analysis techniques, e.g., static analysis of control flow graphs or other profile data, may be utilized to determine the utility of cloning a particular routine. In general, the less the expression is used, or the more paths through a control flow graph that do not utilize the expression provided as an input parameter to a particular routine call, the more valuable the optimization.

It should also be appreciated that the calculation of a clone score for a particular routine call may be omitted in certain circumstances, and that every routine call that incorporates an expression as an input parameter thereto may trigger cloning of the underlying routine. However, in such instances, a risk exists that the size of the resulting computer program may be increased without any corresponding gain in performance.

Returning to FIG. 3, once a clone score is calculated, control passes to block 100 to initiate a loop to process each routine call within the current routine being analyzed. Once all routine calls have been processed, control returns to block 73 to continue with later stage optimizations.

For each routine call in the current routine being analyzed, block 100 passes control to block 102 to determine whether a clone record exists that is associated with the format of the routine call, as well as whether the clone score therefor exceeds a predetermined threshold. It is thus within block 102 where it is determined whether a routine call will initiate cloning of the routine that is the target of the routine call. In this regard, it should be noted that determining whether a clone record exists in either block 86 of FIG. 4 of block 102 of FIG. 3 does not require that the values of the arguments provided in a routine call match the actual values stored within a clone record. Instead, the original parameter list typically includes a list of data types required as input to a particular routine. Thus, routine calls such as "foo(c, a+b)", "foo(c, a+1)" and "foo(c, d+e)" would all typically map to the same clone record.

If it is determined that the clone record does exist and that the clone score therefor exceeds a certain threshold, control passes to block 104 to determine whether a clone routine already exists. In the illustrated embodiment, this is implemented by accessing field 50F of the clone record 50 (FIG. 5) associated with the format of the routine call.

If the clone routine does not yet exist, control passes to block 106 to create the clone routine with the expression implemented within the body of the clone routine, and with input parameters for each of the expression arguments implemented in the routine signature. Put another way, a cloned representation of the routine is generated in the revised representation of the computer program. Within the cloned representation, the expression that was previously provided in the routine call is moved to the body of the clone routine. Furthermore, the routine signature for the clone routine is modified to receive as input the arguments to the expression, rather than the result of the expression as with the original version of the routine.

As discussed above, another step that may be performed in block 106 is population of the clone parameter list in field 50C of the clone record 50. In the alternative, that field may be populated during creation of the clone record.

After the clone routine is created in block 106, or if the clone routine is found to already exist in block 104, control next passes to block 108 to rewrite the routine call being analyzed to call the clone routine. In the rewritten routine call, the expression arguments are input into the routine call parameter list, replacing the expression in the original call parameter list. In the illustrated embodiment, this results in the generation of an implementation of the routine call in the revised representation of the computer program wherein the routine call calls the clone routine, with the revised parameters specified by the signature of the cloned routine. Upon completion of block 108, control returns to block 100 to process each additional routine call.

Returning to block 102, if it is determined either that a clone record does not exist, or that the clone score does not exceed a predetermined threshold, and thus is not a worthy candidate for a routine cloning, block 102 may return control to block 100 to process the next routine call. In the alternative, block 102 may call an optional block 110 to check if a partial match exists for the routine call.

A partial match might exist, for example, if a clone record exists for a particular routine call format where only a subset of a plurality of expressions provided to the routine call have been moved to a clone routine, or where a portion of a compound expression has been moved to a clone routine. As an example, consider an original routine call that takes the form of "foo(a, b+c)", which routine cloning as discussed herein results in the generation of a clone routine (referred to as "foo2") having a signature of "foo2(a, b, c)", and having a body that calculates the result of b+c. If, for example, a later routine call is found having multiple expressions in the parameter list, e.g., "foo(a+d, b+c)", a partial match may be detected, with a partial expression reduction performed via a modified routine call "foo2(a+d, b, c)", so that at least the expression b+c is moved to the clone routine body. Likewise, where a compound expression is provided as an input parameter to a routine call, e.g., "foo(a, (b+d)+c)", partial expression reduction may result in a modified routine call of "foo2(a, b+d, c)", so that at least only the operation b+d is calculated in connection with the routine call. Consequently, block 110 operates to essentially rewrite a routine call to call a clone routine with a partial reduction of the expression or expressions in the routine call if a partial match is detected.

Figure 6:
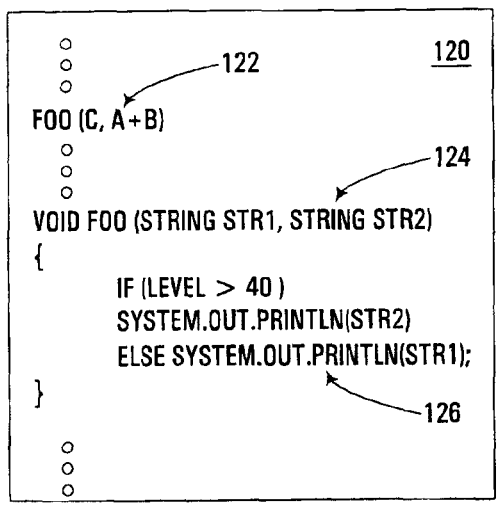
FIGS. 6 and 7 respectively illustrate first and second representations of an exemplary computer program, wherein the second representation is generated from processing of the first representation with the optimization routine of FIG. 3.

As a further example of routine cloning consistent with the invention, FIG. 6 illustrates a first representation 120 of a computer program, including a routine call 122 to a routine "foo" having a signature as shown at 124 and a body shown at 126. It should be noted that the signature 124 for the "foo( )" routine specifies two input parameters. The routine call 122 includes, as its second input parameter, the expression "a+b".

Figure 7:
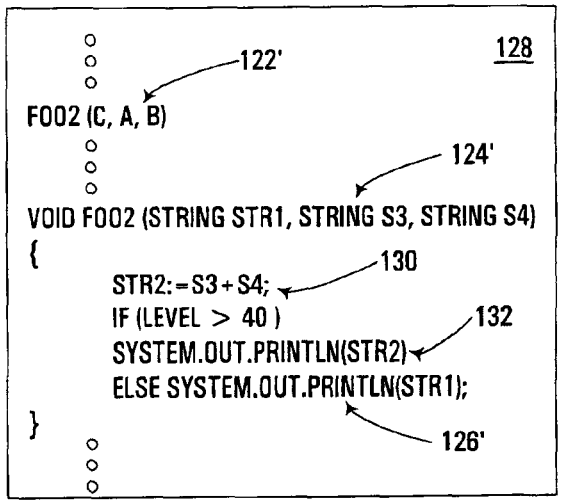

During optimization, it is envisioned that a clone record would be created that is associated with the foo routine, including an original parameter list that accepts two strings as input parameters, and including an expression list that identifies that the second input parameter includes an expression including two string arguments and a string concatenation operation ("+"). Assuming a determination is made that routine cloning would be beneficial in this implementation (e.g., if the clone score associated with the format of routine call 122 exceeds the threshold), the optimization described herein would result in the generation of a second representation 128 of the computer program (FIG. 7) where a routine call 122' is generated to a clone routine "foo2( )" having a signature as illustrated at 124' and a body illustrated at 126'. It should be noted that signature 124' for clone routine "foo2( )" has been modified to incorporate input parameters with the data types of the original arguments to the expression originally provided in the routine call 122 of FIG. 6 (designated in the signature as input parameters S3 and S4). Moreover, the original expression has been implemented within body 126' of clone routine "foo2( )", via a statement 130.

Moreover, routine call 122' now calls clone routine "foo2( )" with the input parameters thereto being the arguments to the expression originally calculated within routine call 122 (FIG. 6).

Various modifications may be made to the illustrated embodiments without departing from the spirit and scope of the invention. For example, in some implementations, it may be desirable to calculate the clone score for each clone record across multiple routines, such that, when each routine call in each routine is analyzed to determine whether to clone a routine, the clone scores will represent routine calls distributed across multiple routines within a computer program. For example, this could be implemented by modifying the optimization routine 64 to first, perform early stage optimizations for each routine, then compute the clone score for each routine call within each routine, and then to perform the loop at blocks 100–110 for each routine after the clone scores have been calculated across the computer program. Later stage optimizations for each routine then may be performed. In this alternative embodiment, therefore, clone routines may be referenced by routine calls that are resident in different routines in a computer program.

In other embodiments, recursiveness may be utilized to perform additional expression reduction via routine cloning. Thus, for example, if one call to a routine is made passing "a+b" and another call is made passing "a+b+c", the latter expression with three variables may result in the generation of a clone routine that receives "a+b" and "c" as separate input parameters, and a second clone routine that receives "a", "b" and "c" as separate arguments.

As also discussed above, other optimizations may enhance the utility of routine cloning consistent with the invention. For example, in the example illustrated in FIGS. 6 and 7, forward store motion may result in the elimination of statement 130 from representation 128, with statement 132 modified to calculate the result of the expression, e.g., "system.out.println(S3+S4)". In such an instance, the overhead of S3+S4 would only occur if the result of that expression is actually used.

In addition, it is possible that other optimizations performed prior to routine cloning will generate additional instances suitable for routine cloning. For instance, a statement "STR=a+b" followed by the statement "foo(STR)" in many circumstances will become "foo(a+b)", and thus, become a suitable candidate for a routine cloning consistent with the invention.

Furthermore, it may be desirable in some implementations to use care when modifying the signature of a virtual method, e.g., where there is run-time method dispatch. Moreover, in some implementations if a compiler has available class hierarchy information, it may be desirable to provide clone routines for overriding routines or methods in addition to a base routine.

It may therefore be seen that cloning routines and modifying routine calls thereto can result in improved performance in a computer program due to the potential for eliminating unnecessary expression calculations, or in the least limiting such expression calculations to instances where the results of such calculations are actually used.

Various additional modifications to the illustrated embodiments will be apparent to one of ordinary skill in the art having the benefit of the instant disclosure. Therefore, the invention lies in the claims hereinafter appended.

What is claimed is:

1. A method of compiling a computer program, the method comprising:
    (a) identifying in a first representation of the computer program a routine call that passes an expression as an input parameter to a routine in the first representation of the computer program;
    (b) generating within a second representation of the computer program an implementation of the routine that calculates the expression; and
    (c) generating within the second representation of the computer program an implementation of the routine call that passes at least one argument for the expression to the implementation of the routine.

2. The method of claim 1, wherein the first representation of the computer program comprises an intermediate representation, and wherein the second representation of the computer program comprises a revised representation.

3. The method of claim 2, wherein identifying the routine call, generating the implementation of the routine and generating the implementation of the routine call are performed during optimization of the intermediate representation of the computer program, the method further comprising generating the intermediate representation from a source code representation of the computer program, and generating an object code representation of the computer program from the revised representation.

4. The method of claim 1, wherein identifying the routine call includes referencing a clone data structure associated with a format of the routine call.

5. The method of claim 4, wherein the format of the routine call is defined by an identifier of the routine referenced by the routine call, and input parameter format data that identifies an input parameter format and an expression format for at least one input parameter.

6. The method of claim 4, wherein identifying the routine call further includes searching for a matching clone data structure, and creating a new clone data structure associated with the format of the routine call in response to not finding a matching clone data structure.

7. The method of claim 1, further comprising determining whether to generate the implementations of the routine and the routine call.

8. The method of claim 7, wherein determining whether to generate the implementations of the routine and the routine call includes calculating a clone score associated with a format of the routine call.

9. The method of claim 8, wherein calculating the clone score includes tracking occurrences of routine calls matching the format of the routine call.

10. The method of claim 9, wherein tracking occurrences of routine calls includes scaling at least one routine call based upon its presence within a loop.

11. The method of claim 1, wherein generating the implementation of the routine includes modifying the routine from the first representation, wherein the routine from the first representation is omitted from the second representation.

12. The method of claim 1, wherein generating the implementation of the routine includes cloning the routine from the first representation to generate a clone routine, wherein the clone routine has the same external response as the routine from the first representation.

13. The method of claim 1, wherein generating the implementation of the routine includes generating the implementation of the routine to have a signature that is configured to receive the at least one argument for the expression.

14. The method of claim 1, wherein generating the implementation of the routine call includes modifying the routine call from the first representation.

15. The method of claim 1, wherein the routine call in the first representation passes a second expression as a second input parameter, and wherein generating the implementation of the routine call in the second representation includes configuring the implementation of the routine call to pass the second expression as the second input parameter.

16. The method of claim 1, further comprising:
    (a) identifying in the first representation of the computer program a second routine call that passes a second expression as an input parameter to the routine in the first representation of the computer program, wherein the second expression has the same expression format as the first expression; and
    (b) generating within the second representation of the computer program an implementation of the second routine call that passes at least one argument for the expression to the implementation of the routine in the second representation.

17. A method of compiling a computer program, the method comprising:
    (a) identifying within the computer program a routine call that calls a routine and that includes an expression supplied as an input parameter thereto;
    (b) cloning the routine to generate a clone routine that is configured to calculate the expression within its body; and
    (c) modifying the routine call to call the clone routine and provide at least one argument from the expression as an input parameter thereto.

18. An apparatus, comprising:
    (a) a memory within which is resident a first representation of a computer program;
    (b) a processor; and
    (c) program code configured to execute on the processor to generate a second representation of the computer program from the first representation by identifying in the first representation a routine call that passes an expression as an input parameter to a routine in the first representation, and generating within the second representation an implementation of the routine that calculates the expression, and an implementation of the routine call that passes at least one argument for the expression to the implementation of the routine.

19. The apparatus of claim 18, wherein the first representation of the computer program comprises an intermediate representation, and wherein the second representation of the computer program comprises a revised representation, and wherein the program code is further configured to compile the computer program from a source code representation to an object code representation.

20. The apparatus of claim 18, wherein the program code is configured to identify the routine call by referencing a clone data structure associated with a format of the routine call, wherein the format of the routine call is defined by an identifier of the routine referenced by the routine call, and input parameter format data that identifies an input parameter format and an expression format for at least one input parameter.

21. The apparatus of claim 20, wherein the program code is configured to identify the routine call by searching for a matching clone data structure, and creating a new clone data structure associated with the format of the routine call in response to not finding a matching clone data structure.

22. The apparatus of claim 18, wherein the program code is further configured to determine whether to generate the implementations of the routine and the routine call by calculating a clone score associated with a format of the routine call.

23. The apparatus of claim 22, wherein the program code is configured to calculate the clone score by tracking occurrences of routine calls matching the format of the routine call.

24. The apparatus of claim 23, wherein the program code is configured to track occurrences of routine calls by scaling at least one routine call based upon its presence within a loop.

25. The apparatus of claim 18, wherein the program code is configured to generate the implementation of the routine by modifying the routine from the first representation, wherein the routine from the first representation is omitted from the second representation.

26. The apparatus of claim 18, wherein the program code is configured to generate the implementation of the routine by cloning the routine from the first representation to generate a clone routine, wherein the clone routine has the same external response as the routine from the first representation.

27. The apparatus of claim 18, wherein the program code is configured to generate the implementation of the routine by generating the implementation of the routine to have a signature that is configured to receive the at least one argument for the expression.

28. The apparatus of claim 18, wherein the program code is configured to generate the implementation of the routine call by modifying the routine call from the first representation.

29. The apparatus of claim 18, wherein the routine call in the first representation passes a second expression as a second input parameter, and wherein the program code is configured to generate the implementation of the routine call by configuring the implementation of the routine call to pass the second expression as the second input parameter.

30. The apparatus of claim 18, wherein the program code is further configured to identify in the first representation of the computer program a second routine call that passes a second expression as an input parameter to the routine in the first representation of the computer program, wherein the second expression has the same expression format as the first expression, and generate within the second representation of the computer program an implementation of the second routine call that passes at least one argument for the expression to the implementation of the routine in the second representation.

31. A program product, comprising:
(a) program code configured to generate a second representation of a computer program from a first representation thereof by identifying in the first representation a routine call that passes an expression as an input parameter to a routine in the first representation, and generating within the second representation an implementation of the routine that calculates the expression, and an implementation of the routine call that passes at least one argument for the expression to the implementation of the routine; and
(b) a signal bearing medium bearing the program code.

32. The program product of claim 31, wherein the signal bearing medium includes at least one of a recordable medium and a transmission medium.

* * * * *